PUSH-PULL MAGNETIC AMPLIFIERS

Filed June 9, 1954 9 Sheets-Sheet 1

INVENTOR
EINO W. LEHTONEN
BY R. V. Craddock
ATTORNEY

INVENTOR
EINO W. LEHTONEN
BY
ATTORNEY

PUSH-PULL MAGNETIC AMPLIFIERS
Filed June 9, 1954 9 Sheets-Sheet 3
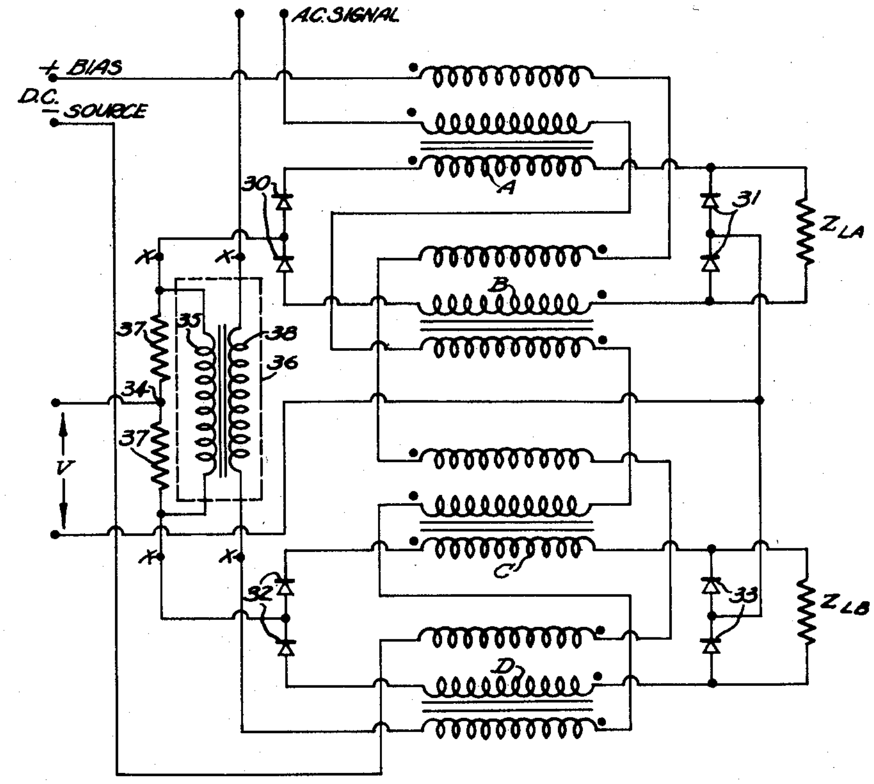
Fig. 6.
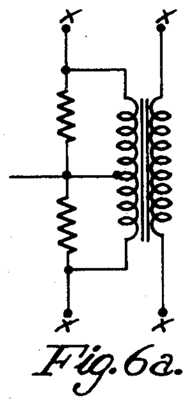
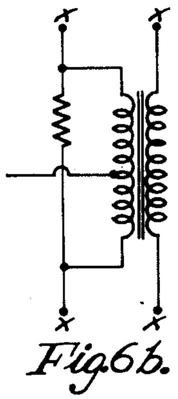
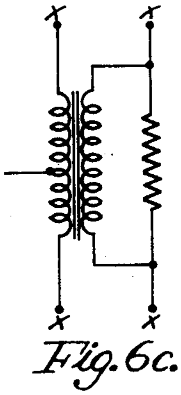
Fig. 6a. Fig. 6b. Fig. 6c.
INVENTOR
EINO. W. LEHTONEN
BY
[signature]
ATTORNEY INVENTOR
EINO W. LEHTONEN
BY R. V. Craddock
ATTORNEY May 24, 1960 E. W. LEHTONEN 2,938,157

PUSH-PULL MAGNETIC AMPLIFIERS

Filed June 9, 1954 9 Sheets-Sheet 5

INVENTOR
EINO W. LEHTONEN
BY R. J. Craddock
ATTORNEY

PUSH-PULL MAGNETIC AMPLIFIERS

Filed June 9, 1954

INVENTOR
EINO W. LEHTONEN
BY R. V. Craddock
ATTORNEY

INVENTOR
EINO W. LEHTONEN
BY C. W. Craddock
ATTORNEY

INVENTOR
EINO W. LEHTONEN
BY C. V. Craddock
ATTORNEY

INVENTOR
EINO W. LEHTONEN
BY R. J. Craddock
ATTORNEY

United States Patent Office 2,938,157

Patented May 24, 1960

2,938,157

PUSH-PULL MAGNETIC AMPLIFIERS

Eino W. Lehtonen, Levittown, N.Y., assignor to Sperry Rand Corporation, a corporation of Delaware Filed June 9, 1954, Ser. No. 435,483

28 Claims. (Cl. 323—89)

This invention concerns magnetic amplifiers and more particularly is directed to an improvement in the alternating current signal controlled type of magnetic amplifier or reactor.

In respect to the nomenclature employed in this art, attempts have been made to distinguish between the terms "saturable reactor" and "magnetic amplifier" on the basis of construction, function, or circuitry. It may be said that every magnetic amplifier includes as an essential component, a ferromagnetic device having an adjustable inductive value. In that sense a saturable reactor may be considered to be a component of a magnetic amplifier. In using these terms herein, it is not intended that this disclosure nor the practice of the invention be limited to a particular area of the art, but rather the terms are used interchangeably insofar as their common usage has established their broadest meaning in the art.

In one typical form of magnetic amplifier, a unidirectional current device is customarily serially connected in circuit with each load winding of a reactor to effect self-saturation by blocking the flow of demagnetizing current. A control winding is usually wound in magnetic flux relation to each load winding. The control windings are connected together in a series arrangement to accept a control signal and thereby cause the flow of load current in the load windings to respond accordingly. It is evident that a change in flux due to the flow of currents in the load windings will induce potentials in the control windings magnetically linked thereto. During the period when the reactors are saturated and load currents flow, there is very little change in permeability and flux density. When only magnetizing currents flow, however, there is a considerable change in permeability and flux density about the load windings in which the magnetizing currents flow. This action will induce undesired potentials in adjacent conductors, such as the control windings which are in magnetic flux relation to the load windings.

When a magnetic amplifier is controlled through the use of a direct current or other source of fixed-polarity magnetic bias, the control windings are usually interconnected and arranged with respect to the load windings so as to effect mutual cancellation of the undesired potentials simultaneously induced in each of the control windings by the flow of magnetizing current through the load windings.

However, when an alternating current control signal is utilized to regulate the flow of load current, the control windings are arranged so that the alternating current control signal will operate alternately upon associated load windings. In order to effect this result, the series connections between control windings in the alternating current controlled magnetic amplifier are reversed as compared with those of the control windings in the direct current controlled magnetic amplifier. Though this arrangement affords the desired mode of control by an alternating current control signal, it also results in the addition of rather than the subtractive cancellation of said undesired potentials induced in each of the control windings. Typical alternating current controlled magnetic amplifiers are disclosed in U.S. Patents 2,259,647 and 2,554,203.

It is the principal object of the present invention to substantially eliminate the undesirable potential induced in the control windings of a magnetic amplifier which utilizes alternating current control.

The present invention is particularly intended to eliminate undesirable potentials induced in amplifiers of a push-pull type which will be more thoroughly discussed and described hereinafter. This type of amplifier may be designed to supply a load with either direct current or alternating current power. My copending application Serial No. 435,497, filed on June 9, 1954, and titled "Improvement in Single-Ended Magnetic Amplifier" discloses an invention which has as its object the solution of the analogous problem presented by the undesired potentials induced in the control windings of single-ended, magnetic amplifiers when adapted to alternating current control.

An alternating current controlled magnetic amplifier constructed to operate in accordance with the teachings of the present invention will virtually obviate any undesired induced potential which might otherwise be present in its control windings. This makes it unnecessary to use a counter-measure such as a large impedance in the control circuit which had sometimes been done in alternating current controlled magnetic amplifiers of the past in order to dissipate and attenuate the undesired potential induced therein.

The resultant advantages of an increased degree of control and efficiency which flow from the virtual elimination of unwanted induced potentials in the control circuit of such a magnetic amplifier when operating in accordance with the concept of the present invention, will appear more fully from the explanation of the operation of the several embodiments disclosed hereinafter in the drawings in which:

Fig. 6 is a schematic representation of a bridge embodiment of the present invention;

Figure 7:
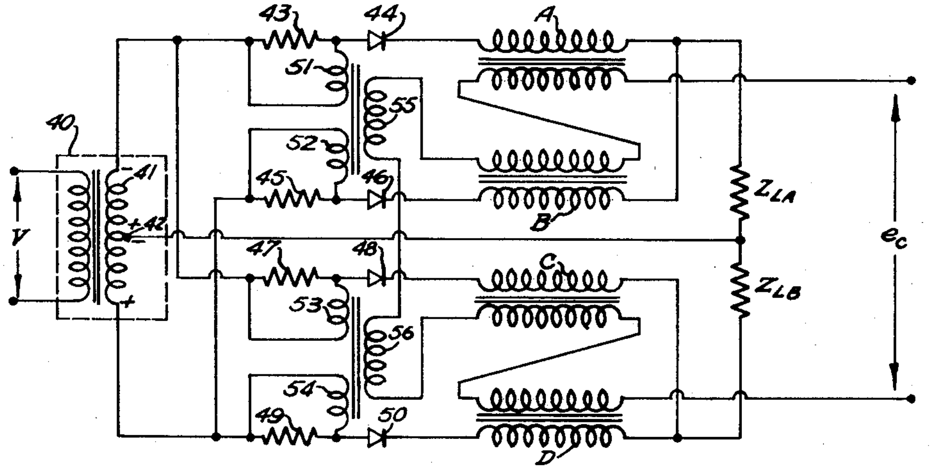
Figure 8:
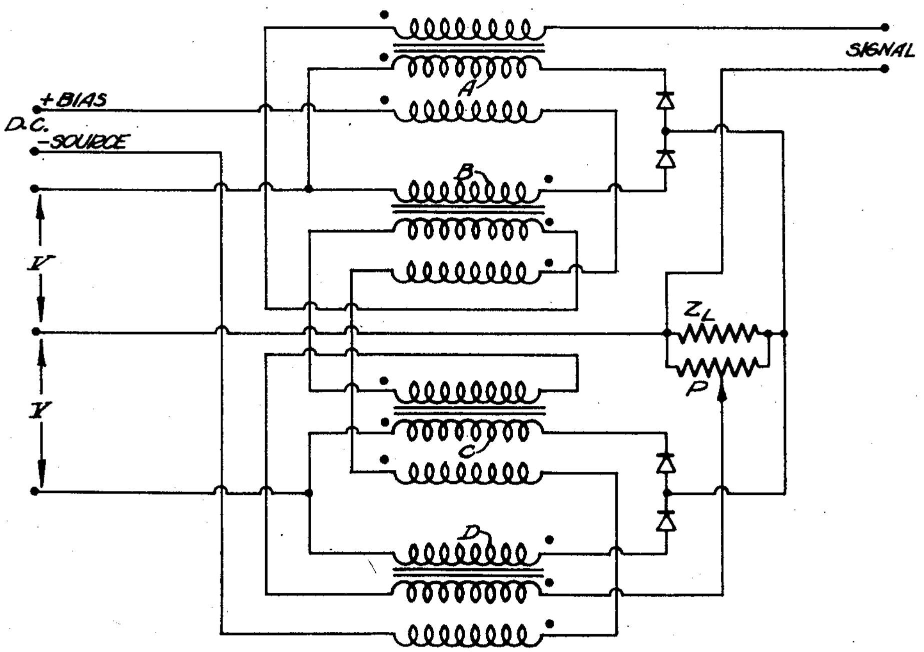
Figure 9:
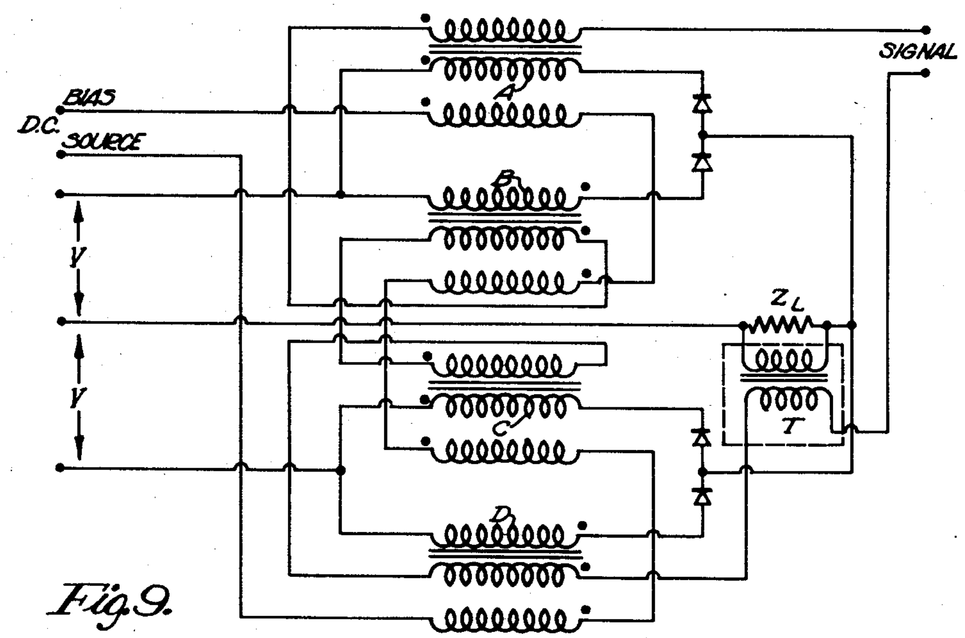
Figure 10:
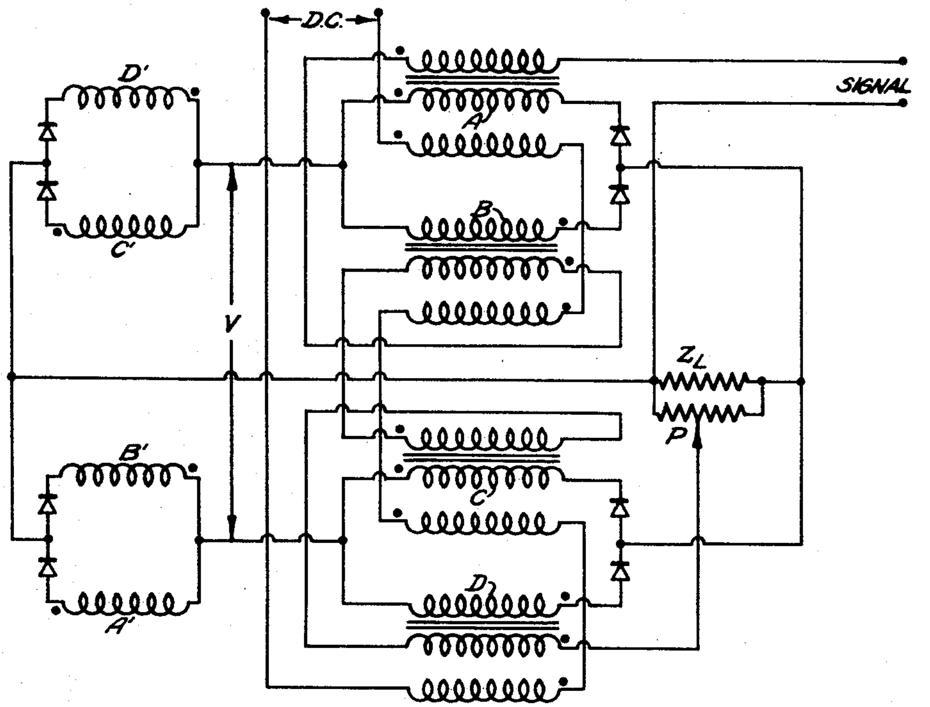
Figures 11, 12:
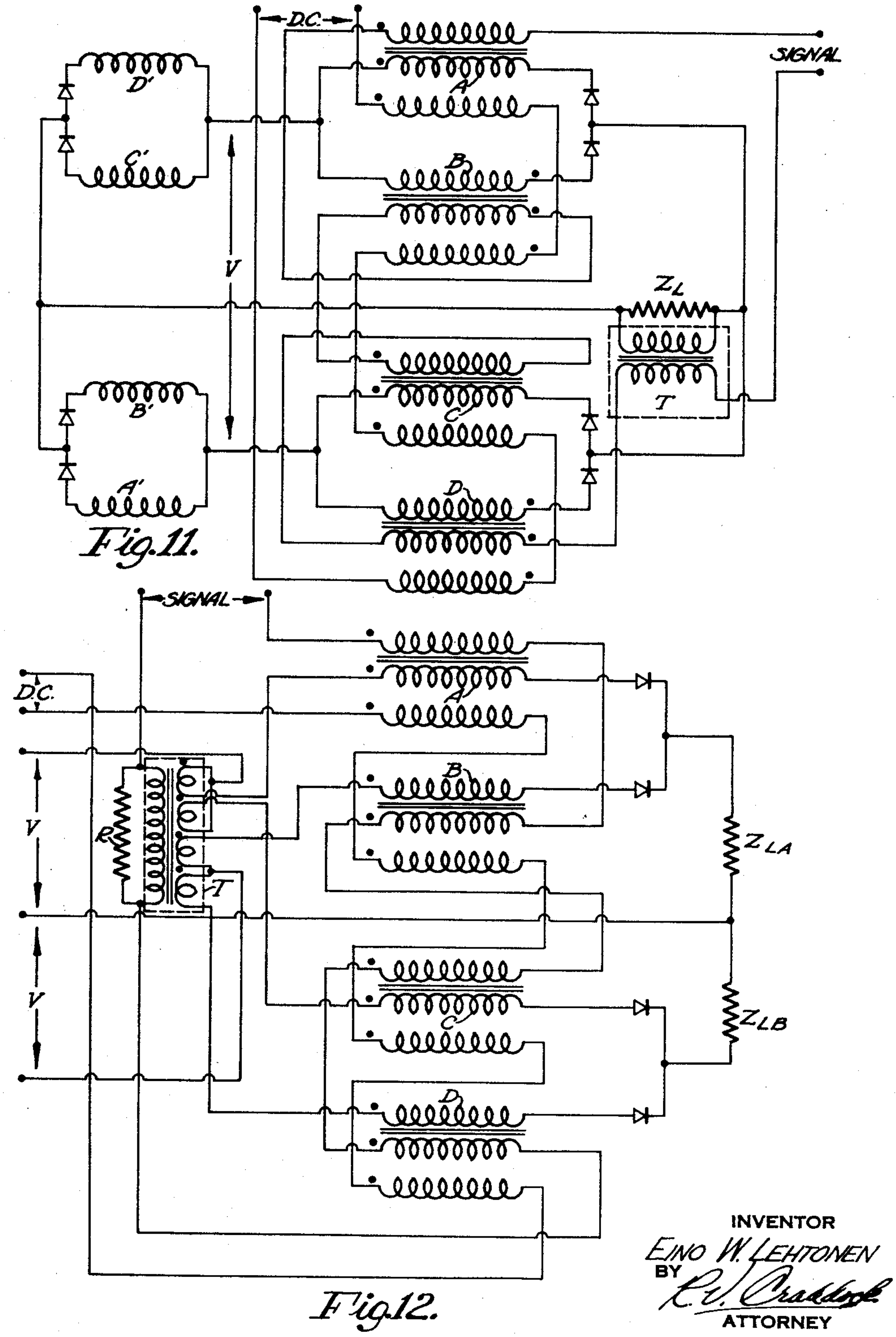
Figure 13:
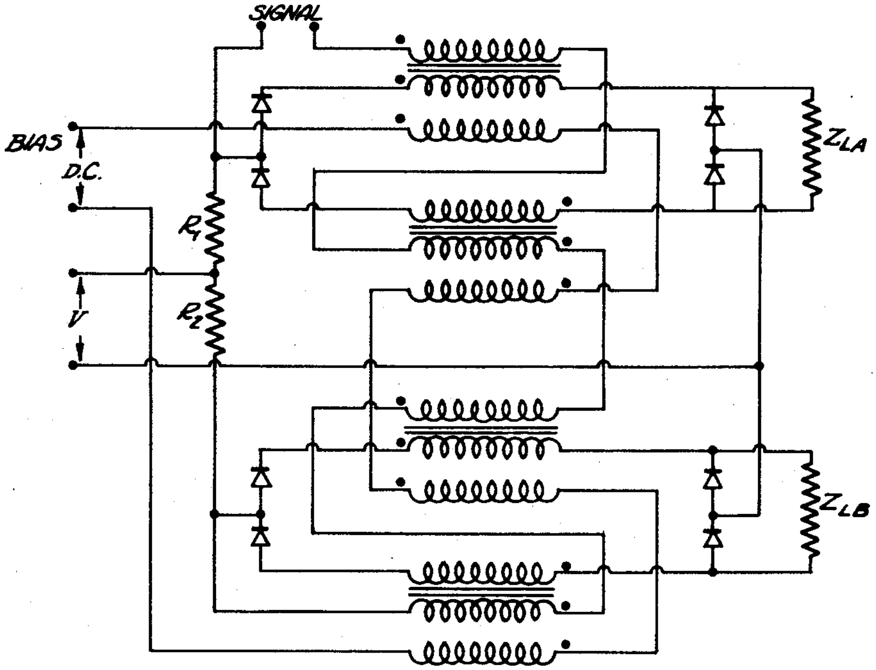
Figure 13A:
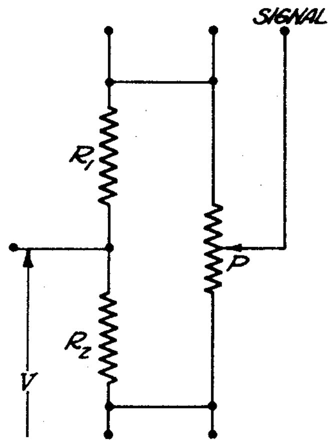
Figure 14:
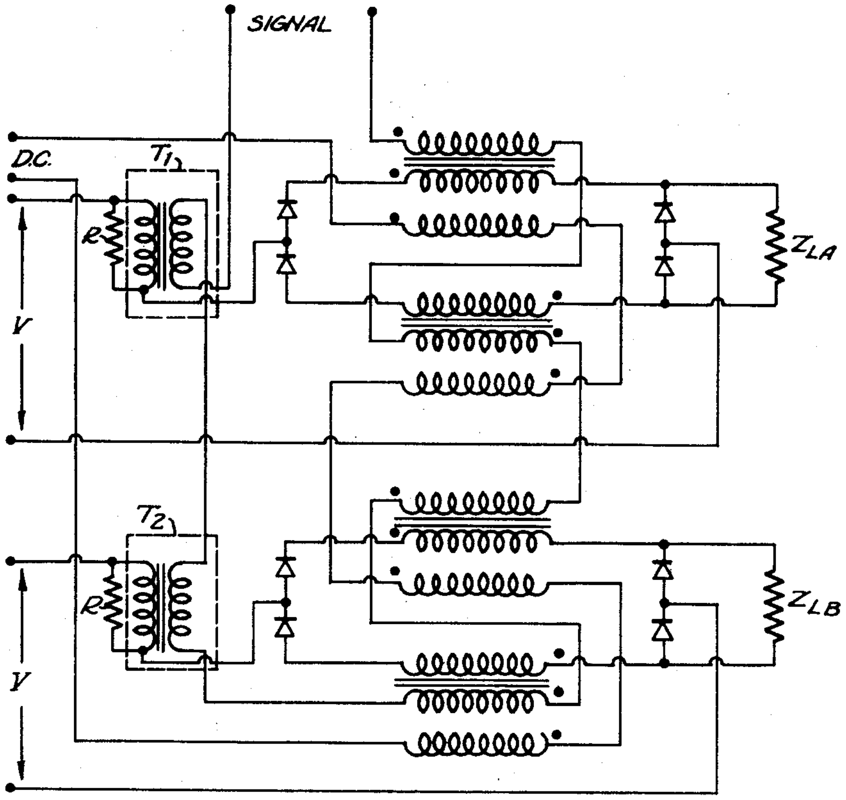
Figure 14A:
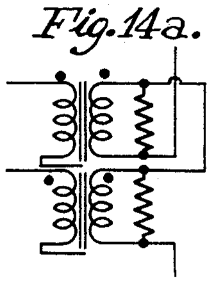
Figure 14B:
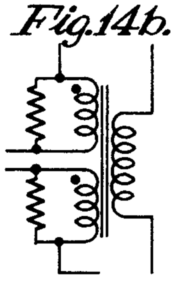
Figure 14C:
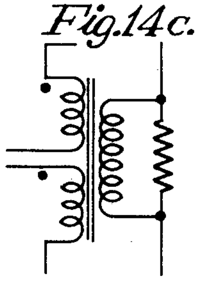
Figure 15:
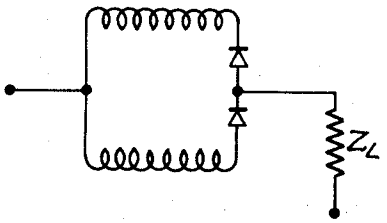
Figure 16:
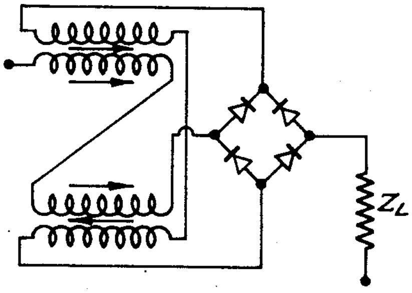
Figure 17:
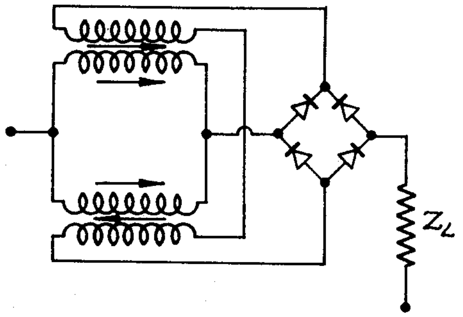
Figure 18:
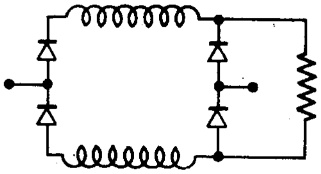
Figure 19:
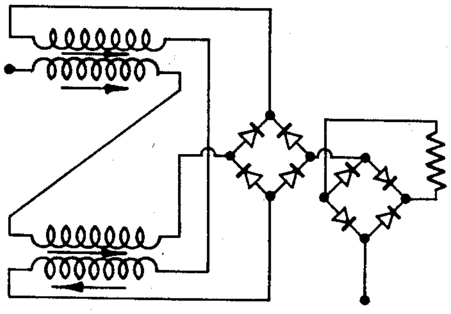
Figure 20:
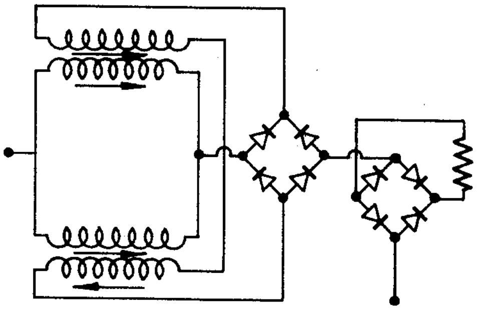

Figs. 6*a*, 6*b* and 6*c* schematically illustrate components which may be used in the embodiment of Fig. 6;

Fig. 7 is a schematic representation of a center-tap, full-wave embodiment of the present invention;

Fig. 8 is a schematic diagram of another bridge embodiment of the present invention;

Fig. 9 is a schematic diagram of another doubler embodiment of the present invention;

Fig. 10 is a schematic diagram of a doubler bridge embodiment of the present invention;

Fig. 11 is a schematic diagram of another doubler bridge embodiment of the present invention;

Fig. 12 is a schematic diagram of another center-tap, full-wave embodiment of the present invention;

Figs. 13 and 14 are schematic diagrams of additional bridge embodiments of the present invention;

Fig. 13*a* schematically illustrates a component which may be used in the embodiment of Fig. 13;

Figs. 14*a*, 14*b* and 14*c* are schematic diagrams of components which may be used in the embodiment of Fig. 14;

Fig. 15 is a schematic diagram of the self-saturating components of a doubler magnetic amplifier;

Figs. 16 and 17 are schematic diagrams of external feedback circuits which may be used to effect the purposes of self-saturation in a doubler magnetic amplifier;

Fig. 18 is a schematic diagram of the self-saturating components of a bridge magnetic amplifier; and Figs. 19 and 20 are schematic diagrams of external feedback circuits which may be used to effect the purposes of self-saturation in a bridge magnetic amplifier.

In view of their relative circuit simplicity, self-saturating magnetic amplifiers, utilizing a unidirectional current device in series with each load winding, are generally shown in the preferred embodiments of the present invention. As is known in the art, however, there are other ways, for example, by means of external feedback, in which the purposes of self-saturation may be accomplished. The practice of the present invention is in no way confined exclusively to magnetic amplifiers of the so-called self-saturating type.

Figs. 1, 3 and 5 through 14 illustrate embodiments of magnetic amplifiers wherein each load winding has a unidirectional device serially connected with it in each load circuit to effect self-saturation. The arrangement of Fig. 15, which schematically represents the self-saturating components of such a type magnetic amplifier may be replaced by the arrangement of Fig. 16 or Fig. 17 in any embodiment disclosed herein where the self-saturating reactors are arranged in the configuration of Fig. 15.

Fig. 16 schematically represents an external feedback winding which may be employed to achieve the same self-saturating effect as that accomplished by the arrangement of unidirectional devices shown schematically in Fig. 15. The feedback windings in Fig. 16 are connected to conduct as indicated by the arrows during one half-cycle of operation of the power source. The load current magneto motive force created in the lower load winding of Fig. 16 is seen to be cancelled by the magneto motive force created in the feedback winding by opposite flow of the same load current in the adjacent feedback winding. The result is that the lower load winding is free of M.M.F. due to load current in the period immediately following and in effect is self-saturating. The same results obtain for the upper load winding during the other half-cycle alternation of the power source.

Fig. 17 shows an external feedback winding arranged to operate in a similar manner. The arrows may be assumed to indicate current flow during only one half-cycle of the power source, and it is seen that the desired results are achieved by an operation closely analogous to that of the arrangement shown in Fig. 17.

A bridge arrangement such as that shown in Fig. 18, wherever it appears in any of the disclosed embodiments, may be replaced by an external feedback arrangement of the type illustrated by Fig. 19 or Fig. 20. Operation of the windings shown in these latter two figures is consistent with the principle of operation of the apparatus shown in Figs. 16 and 17. The arrows indicate the direction of load current flow through the load windings and feedback windings during one half-cycle of operation to effect mutual cancellation of the M.M.F. developed thereby. As a consequence, the power winding in which this is achieved is in effect self-saturating in the period immediately following the cancellation of M.M.F. The same mode of operation obtains for the alternate half-cycle of operation.

It should be borne in mind that a means of effecting self-saturation is necessary to the practice of the present invention only insofar as the inventive concept is directed to the solution of a problem peculiar to self-saturation phenomena.

In self-saturating and external feedback magnetic amplifiers, the point of time at which saturation takes place is controlled in displacement or phase relationship with respect to the applied excitation voltage so as to regulate the flow of load current. Thus in the art, the time of conduction within a cycle of operation has assumed the designation of the "firing angle" of the reactor because of the similarity of this characteristic of the self-saturating reactor to that of gas-filled electron tubes such as thyratrons, for instance.

Figure 1:
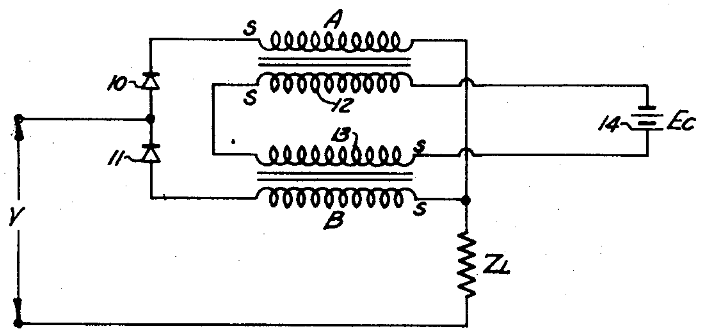
Fig. 1 is a schematic diagram of a direct current controlled magnetic amplifier which is self-saturating by way of example.

Referring now to Fig. 1, which schematically represents a direct current controlled, self-saturating magnetic amplifier, it may be seen that the alternating current excitation potential applied across the load $Z_L$ and two parallel-connected load circuits causes current to flow through the load windings A and B on alternate half-cycles of the power source. Alternate conduction is effected by two oppositely poled unidirectional current devices 10 and 11. The point at which saturation occurs and current begins to flow in the load $Z_L$ is controlled by the magnetization bias resulting from the flow of direct current through two serially connected control windings 12 and 13, one of which is associated with each load winding.

The control windings 12 and 13 are connected in series to a source of direct current control voltage $E_c$ which in this embodiment takes the form of a battery 14. However, any suitable direct current control signal may be utilized. The flow of magnetizing current through load winding A, for instance, will induce in the control winding 12 a potential of one polarity, while the flow of magnetizing current on the same half-cycle through load winding B will induce in the control winding 13 a potential of the opposite polarity. The control windings 12 and 13 being connected in a common series circuit as shown, produce the result that the potentials induced in the two control windings of this magnetic amplifier cancel each other. This is generally true of direct current controlled magnetic amplifiers and is one reason why that type of device has found favor in the art.

Figure 2:
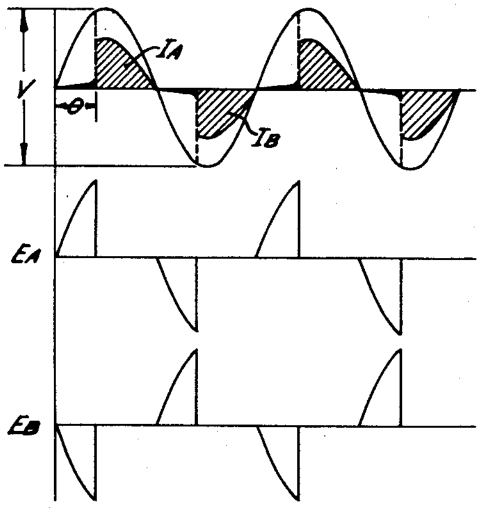
Fig. 2 is a series of waveforms illustrating the potentials developed in the magnetic amplifier of Fig. 1.

This operation is illustrated graphically by the waveforms of Fig. 2 where the first waveform illustrates the excitation potential which is applied across the magnetic amplifier and the load. The dash lines represent the saturation point at which conduction begins and the angle $\theta$ is the "firing angle" mentioned previously. The cross-hatched area represents current flow through each load winding and the load. During the period before the firing angle is reached, a small magnetizing current, shown by the darkened area adjacent to the time base abscissa, flows through the load winding and induces a potential in the control winding with which it is magnetically linked. When the core becomes saturated, its flux density remains relatively stable and virtually no potential is induced in the control winding.

The second waveform of Fig. 2 illustrates the potentials developed across the control winding associated with load winding A, while the third waveform illustrates the potentials developed across the control winding associated with load winding B. The latter two potentials are seen to be mutually cancelled, and this of course is effected by the series connection of the two windings in the control circuit.

The direct current control windings, as shown in Fig. 1, effect advancement or retardation of both the positive and negative portions of the load current firing angle. Substantially the same operation would be realized in each half of a push-pull version of a direct current controlled amplifier having a duplicate second counterpart of the same type as that shown in the single-ended amplifier of Fig. 1.

Figure 3:
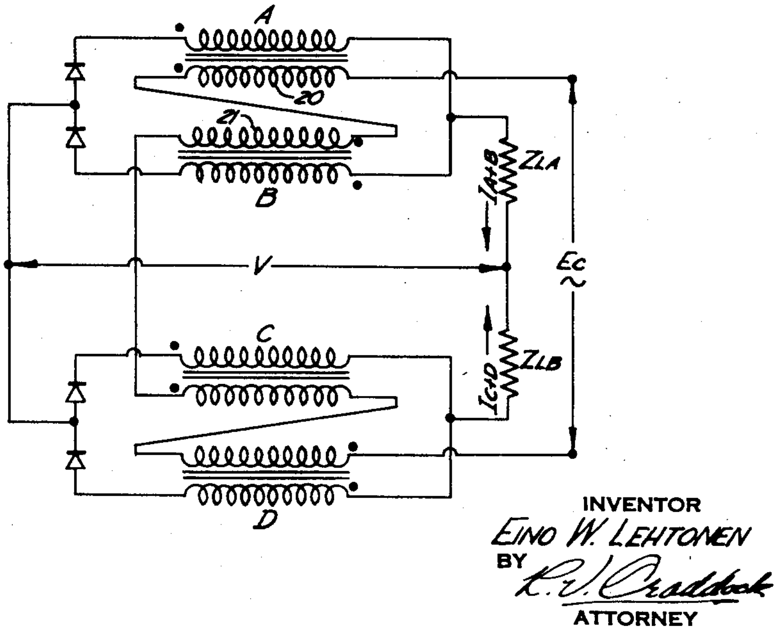
Fig. 3 is a schematic diagram of push-pull, doubler type, self-saturating amplifier which is alternating current controlled and supplies a split load.

Fig. 3 illustrates a doubler type, push-pull, self-saturating magnetic amplifier supplying twin loads and arranged to be controlled by an alternating current signal rather than the direct current control utilized in the apparatus of Fig. 1. In order for an alternating current signal to control a magnetic amplifier of this type, the control windings must be so connected with respect to each other and with respect to the load windings that the point of time at which load currents will begin to flow in one pair of windings is advanced by the alternating current control signal, while the point of time at which the other pair of load windings will begin to conduct will be retarded by the alternating current control signal. One winding of each pair will conduct during the same half-cycle as one winding of the other pair. The sum result of such operation is that there is a differential load current between each two such conducting windings in response to the alternating current control signal. Usually the alternating current control signal is of the same frequency as the alternating current excitation source though it need not be precisely "in phase" with the excitation source. Customarily, however, the control signal has a fixed phase relation with respect to the excitation signal for most types of operation.

It should be noted that the control windings 20 and 21 associated with load windings A and B in Fig. 3 have a reversed series connection therebetween as compared with the control windings 12 and 13 associated with load windings A and B in Fig. 1. This connection affords the advancing or retarding of the conduction point of the load windings in response to the alternating current control signal. The series connection between the other pair of control windings is similarly reversed. However, while this arrangement affords the desired alternating current control mentioned hereinbefore, it also induces potentials in the control windings which are undesirable. The operation of self-saturating alternating current controlled magnetic amplifiers is such that potentials induced in the control windings cancel each other only in part, with the result that a net potential remains which in many ways detracts from the desirability of an alternating current controlled magnetic amplifier. An analysis of the theory of operation and design considerations applicable to alternating current controlled magnetic amplifiers of the self-saturating type may be had from an article written by Sidney B. Cohen which appeared in the Proceedings of the I.R.E., volume 39, No. 9, September 1951.

Figure 4:
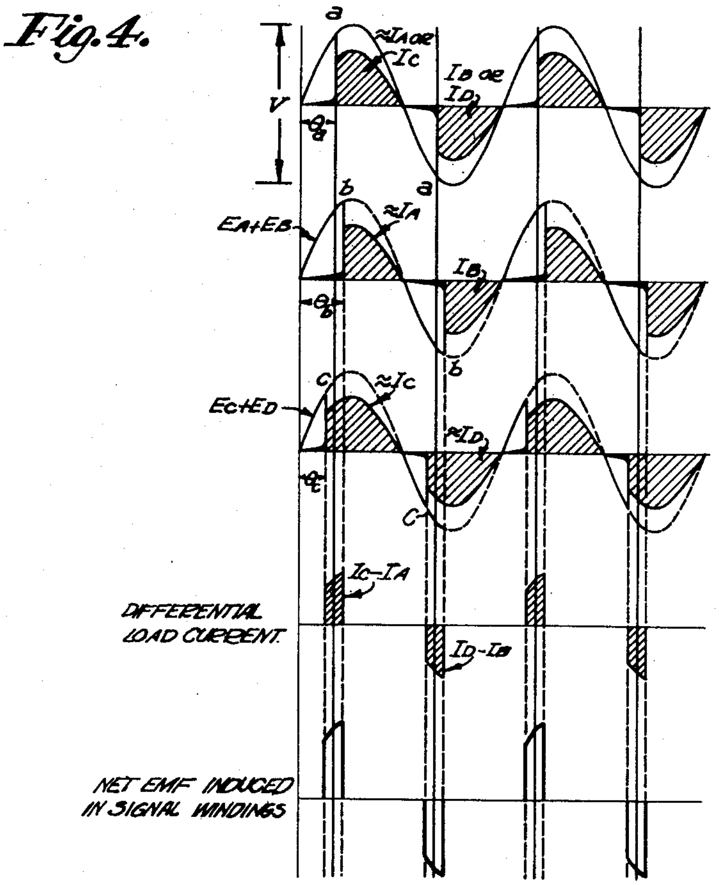
Fig. 4 is a series of waveforms illustrating the potentials developed in the magnetic amplifier of Fig. 3.

The waveforms of Fig. 4 are intended to illustrate as simply as possible the relationship pertinent to the potentials induced in the control windings of a self-saturating magnetic amplifier of the type illustrated in Fig. 3. Accordingly, these waveforms are of idealized shape and configuration to facilitate understanding the correlation between the operative functions of the magnetic amplifier. The outline of the first waveform of Fig. 4 shows the alternating current excitation V which is impressed upon the magnetic amplifier and the load of Fig. 3. This is illustrated as having a substantially sinusoidal wave shape in Fig. 4, but the practice of the present invention is not limited to sine wave excitation sources. It shall be assumed for the purposes of explanation that when no control signal is applied to the apparatus of Fig. 3, saturation of the load windings and conduction therethrough begin at the point of time indicated as "*a*" on the first waveform. The firing angle with no control signal applied is thus $\theta_a$. Under these conditions windings A and C will conduct on the positive half-cycle of the applied excitation voltage as illustrated by the waveforms. Windings B and D will conduct similarly on negative half-cycles. However, the current $I_A$ flowing from winding A is opposed in the load by the current $I_C$ flowing from winding C, and since they are of equal amplitude and duration, and coincident in time, no net current is caused to flow in the load. The same is true of the current flowing through windings B and D so that when no control current is applied to the apparatus of Fig. 3, no net or differential load current will flow.

If the further assumption is made that an alternating current control signal has the effect of retarding the conduction point "*a*," a point of time such as "*b*," shown on the second waveform of Fig. 4, will represent the instant of time when conduction will begin in these windings. Thus the firing angle is increased to the value of $\theta_b$. Conduction through windings A and B of the apparatus of Fig. 3 will then continue through the period indicated by the cross-hatched areas designated as $I_A$ and $I_B$ in the second waveform of Fig. 4.

The same alternating current control signal will advance the conduction point of load windings C and D, thereby decreasing the firing angle from $\theta_a$ to a value such as $\theta_c$. The initiation of conduction for windings C and D is indicated at the point of time "*c*" on the third waveform of Fig. 4. When the flow of current in winding A opposes that of winding C in the load, a net resultant or differential current flows as is shown by the fourth waveform of Fig. 4. The same mode of operation prevails with respect to windings B and D and both the positive and negative portions of the net resultant currents flow through the load. Thus in this particular embodiment, the load current has an alternating current component of the frequency of the fundamental of the excitation power source and the amount of differential current flow is determined by the alternating current control signal.

It is apparent that a net difference exists between the two firing angles $\theta_b$ and $\theta_c$ as well as between the two load currents which flow. It will be recalled that during the period called the "firing angle" of a load winding, a magnetizing current flows therein, inducing a potential in the control winding which is in magnetic flux relation with it. If the firing angles for two load windings which conduct during the same half-period of the applied excitation voltage are unequal, as they are for the pair of windings such as A and C, and the pair B and D, for instance, the periods during which magnetizing currents flow will accordingly be of different duration.

The periods during which only magnetizing currents flow may be considered to be those periods during which no load currents flow as shown in the second and third illustrative waveforms of Fig. 4. It follows that the potentials induced in the control circuit by such magnetizing current will be of different duration and therefore are not capable of entirely cancelling each other regardless of how they are combined or opposed to each other. Usually, however, the control windings are arranged and interconnected to effect partial cancellation of the induced potentials so that there remains a resultant potential in the control windings having substantially the same waveform as the resultant differential potential which causes current flow through the load. This remaining differential potential in the control windings is illustrated by the fifth waveform of Fig. 4 and it is an undesired and troublesome effect which detracts from the desirability of alternating current controlled self-saturating magnetic amplifiers.

It had been the practice in the prior art to connect a large impedance in the control circuit of this type of amplifier so as to dissipate the undesirable potential induced therein. However, this corrective measure obviously reduced the effectiveness of the control signal applied to the control windings of the amplifier because the impedance acted upon the control signal to partially dissipate it in the same manner as it dissipated the undesired induced potential. Consequently, the attenuated control signal was rendered less effective to achieve its intended function.

Other expedients such as specially connected reactors, and core structures of particular design have been used to reduce or minimize the effect of the undesired induced potentials in the control winding, but most of these expedients necessarily incur other disadvantages or are not wholly effective in eliminating the undesired induced potential.

The present invention embodies the method and means for automatically cancelling and eliminating the remaining or net undesired potential in the control windings. By connecting an appropriate impedance in the path of the flow of differential load current, a cancellation potential may be developed having substantially the same waveform as the differential or net load potential, which is the same waveform as the undesired potential induced in the control windings. This cancellation potential is impressed upon the control circuit so as to be opposed in phase and equal in amplitude to the undesired induced potential with the result that the two mutually cancel each other.

Figure 5:
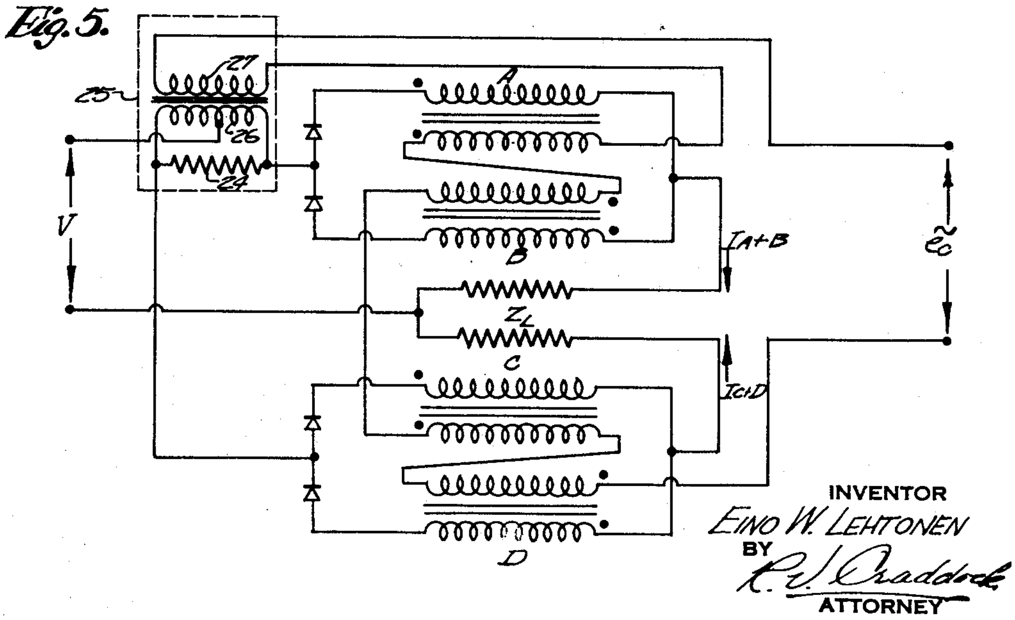
Fig. 5 is a schematic representation of a doubler type magnetic amplifier embodying the present invention.

Fig. 5 is an embodiment of the present invention, wherein an impedance 24 is connected in parallel with the primary winding 26 of a transformer 25. The center-tap of the primary winding 26 is connected to receive the power source, V, and all the load currents must flow therethrough. The secondary winding 27 of the transformer is connected to the control circuit and in response to the flow of load currents through the primary winding 26 of the transformer, there is induced in the secondary winding 27 of the transformer a potential of like waveform which is impressed upon the control circuit. This latter potential is of substantially the same waveform as the undesirable potential which is induced in the control windings as a result of magnetizing current flow through the load windings.

The winding ratio of the transformer 25 is such that the potential which is impressed upon the control circuit will be equal in amplitude and opposite in phase to the undesired induced potential. These potentials are thus caused to mutually cancel each other with the result that the alternating current control signal applied to the control winding is more nearly wholly effective to control flow of load currents through the magnetic amplifier. The necessity for the use of large impedances connected in the control winding or other cumbersome expedients to effect dissipation of the undesired potential is entirely eliminated, resulting in much increased efficiency of operation and enhanced control of the magnetic amplifier.

It is evident of course that the present invention conceives not only the use of a transformer in the form shown in Fig. 5 to develop and supply the necessary cancellation signal to the control circuit, but it also embraces the use of any appropriate impedance which will develop the proper potential by the flow of load currents. The impedance may be, for instance, a resistive element with an appropriate means of tapping the desired amplitude of potential to be impressed upon the control signal circuit. It is also contemplated by the present invention that the impedance which develops the cancellation potential may be connected on the output side of the load windings as well as the input side. In some embodiments the impedance may be connected between a split load as will be explained more fully hereinafter.

In actual practice it may be desirable to utilize a secondary control circuit comprising a number of secondary control windings wound in magnetic flux relation to the load windings and connected to receive a direct current signal. This arrangement affords a means of effecting a magnetic bias control which may be used to shift the quiescent conduction point and change the firing angle. Several embodiments of this type of additional control are illustrated in the drawings and this type of operation will be explained more fully hereinafter. The concept of the present invention applies in substantially the same manner to this latter type of modified magnetic amplifier and it is to be understood that the use of such bias, while effecting improved efficiency in some applications, does not involve any significant or material departure from the operation of embodiments previously described insofar as this invention is concerned.

It is equally evident that more than one control circuit may be employed in the embodiments disclosed herein so as to accept a varying direct current control signal and an alternating current control signal at the same time. Thus the use of secondary control windings arranged in a secondary control circuit is not confined to the employment of a fixed value of direct current to effect bias, but the secondary windings may be so interconnected and arranged as to afford control of the magnetic amplifier in response to a completely independent secondary signal.

No one particular configuration of core structure is necessary to the practice of the present invention, and those skilled in the art will readily appreciate that different types of cores may be utilized in arrangements carrying out the magnetic flux relationships schematically disclosed herein.

The embodiment of Fig. 6 shows a magnetic amplifier of the push-pull bridge type in which separate loads $Z_{LA}$ and $Z_{LB}$ may be supplied with direct current power and controlled by an alternating current signal. An appropriate cancellation signal is developed in accordance with the teachings of the present invention and impressed upon the control winding circuit to cancel the undesired potentials induced therein. In this embodiment oppositely poled pairs of rectifiers 30, 31, 32 and 33 are paired and connected to either end of the load windings A and B, and C and D. Each pair of load windings has a load connected to it such as $Z_{LA}$ and $Z_{LB}$.

One side of the excitation source V is connected to the junction of each of the oppositely poled pairs of rectifiers 31 and 33 on the output side of the load windings, while the other side of the excitation source V is connected to the electrical midpoint 34 of a resistance 37. The primary winding 35 of a transformer 36 is connected across the resistance 37. The junctions of the resistance 37 and primary winding 35 are each connected to the junctions of each of two pairs of rectifiers 30 and 32.

The flow of unequal load currents through the two halves of the resistance 37 causes unequal potentials to be developed, the difference of which is proportional to the differential load current. This difference of potential across the primary winding 35 causes a like waveform to be induced in the secondary winding 38.

The primary winding 35 of the transformer 36, therefore, induces in its secondary winding 38 a potential having a waveform substantially the same as the waveform of the undesired potential induced in the control windings. The windings of the transformer 36 are of such ratio and arrangement that the potential thus developed is equal in amplitude and opposite in phase to that of the undesired induced potential. The secondary winding 38 of the transformer 36 is connected to the control circuit so that the undesired induced potentials in the control circuit are cancelled by the potential developed across the secondary winding of the transformer.

Secondary control windings are provided in this embodiment to afford independent regulation of magnetic bias by connection to a direct current source. These secondary windings may, however, be interconnected and arranged to provide control by an additional control signal as has been described previously. Figs. 6*a*, *b* and *c* illustrate alternate arrangements of transformers which may be employed in place of transformer 36 at points "*x*" in the embodiment of Fig. 6 to develop an appropriate cancellation signal in accordance with the teachings of the present invention.

The embodiment of Fig. 7 shows an excitation source, V, applied to a push-pull, full-wave, self-saturating magnetic amplifier by means of a transformer 40 having a secondary winding 41, the ends of which are connected to appropriate load windings and the center tap 42 of which is connected to the electrical midpoint of the split load represented as $Z_{LA}$ and $Z_{LB}$. An impedance in the form of a resistive element such as that shown at 43 may be connected in series with a unidirectional current device 44 and each load winding. Similar arrangements of like components 45 and 46, 47 and 48, 49 and 50 are shown in respective series connection with the other load windings.

Each resistive element such as 43 has a primary winding of a transformer such as 51 connected thereacross. Similar arrangements are provided for each load winding. The secondary windings 55 and 56 of these transformers are connected to the control circuit. The flow of load currents through the load windings develops a potential across the resistances and causes a current to flow through the respective primary winding of each transformer. Potentials are thus induced in the secondary windings 55 and 56 of the transformers. The secondary windings 55 and 56 are connected so as to be additive and the summation which is thereby accomplished produces a potential equal in amplitude and opposite in phase to the unwanted potentials induced in the control windings by magnetizing current flow in the load windings. The secondary windings 55 and 56 are connected directly into the control circuit and cancellation of the undesired induced potentials is thus achieved because the cancellation potential in addition to being equal in amplitude and opposite in phase is also of substantially the same duration and waveform as the unwanted net induced potential in the control circuit. If this suggested type of configuration were employed on the output side of the load or load windings, the operative results would be substantially the same as that previously explained in connection with the embodiment of Fig. 7 as it is illustrated.

The embodiment of Fig. 8 shows a doubler type, push-pull magnetic amplifier connected to a center-tapped excitation source. The load windings A, B, C and D have oppositely poled unidirectional devices connected therewith in a manner similar to the arrangement illustrated in the embodiment of Fig. 5. The load $Z_L$ is connected to the center tap of the excitation voltage V on one side and to the output side of both pairs of load windings on the other side. An impedance P is connected between the high potential side of the load $Z_L$ and also to the control circuit. A variable tap on the impedance P completes the circuit to the control windings and provides a means of selecting an appropriate portion of the signal developed across the impedance P in order to cancel the unwanted induced potential in the control winding.

The embodiment illustrated in Fig. 9 is substantially the same as that of Fig. 8 insofar as the excitation source, load windings and control windings are concerned. The load is also similarly connected. However, the primary winding of a transformer is connected across the load and the secondary winding is connected in series with the control circuit to afford the desired cancellation of the unwanted potentials induced in the control circuit.

The embodiment of Fig. 10 illustrates a magnetic amplifier arranged in a push-pull doubler bridge circuit, sometimes called a double bridge. Load winding A′ is wound in magnetic flux relation to load winding A; B′ and B, C′ and C, and D′ and D are wound in similar respective flux relationships. The load windings A, B, C and D and the unidirectional devices associated therewith, illustrated schematically as the right-hand portion of this embodiment, are connected symmetrically with respect to the load windings A′, B′, C′ and D′ and the unidirectional devices illustrated in the left-hand portion of the schematic representation. Between the right-hand and the left-hand schematic portions of this embodiment, an excitation source V is impressed. In addition to the load windings and unidirectional devices, the bridge circuit diagram of Fig. 10 has a control winding associated with and magnetically linked to each pair of respective load windings A and A′, B and B′, C and C′ and D and D′.

The control windings are arranged and connected in a control circuit similar to that shown in the embodiment of Fig. 8, for instance. The load $Z_L$ is connected to the output side of the right-hand portion of the bridge and also the opposite junction of the bridge. An impedance P is connected in shunt with the load $Z_L$ and a variable tap is provided by which a selectable portion of the potential developed across the impedance P may be tapped. Such tapped potential is fed to the control circuit by an appropriate connection to cancel the undesired potential induced in the control circuit by the flow of magnetizing currents in the load circuits.

The embodiment illustrated in Fig. 11 is similar in its bridge arrangement to that of Fig. 10. It differs, however, from the embodiment shown by Fig. 10 in the manner in which the cancellation potential is developed. The primary winding of a transformer T is connected in shunt with the load $Z_L$ and the secondary winding of the transformer T is connected directly to the control circuit so as to effect the desired cancellation. The windings of the transformer T are of suitable ratio and wound so as to produce a potential opposite in polarity and equal in amplitude to the net unwanted potentials in the control circuit.

The embodiment of Fig. 12 shows a push-pull bridge type of amplifier having four load windings, each of which has a unidirectional device connected in series with it. The source of excitation V which is applied to the embodiment of Fig. 12 has a center tap. The separate loads $Z_{LA}$ and $Z_{LB}$ are connected from the output sides of different pairs of load windings to the center tap of the power source V. The load windings are connected on their input side to the source V through the primary windings of a transformer T which are connected and arranged so that the flow of load currents induce in the secondary winding of the transformer T additive potentials which upon summation will produce a waveform of configuration and amplitude suitable for cancelling the undesired potentials induced in the control winding by the flow of magnetizing currents in the load windings.

The embodiment of Fig. 13 is a push-pull bridge type magnetic amplifier supplying separate loads $Z_{LA}$ and $Z_{LB}$. A power excitation source V is applied across the load windings in a manner similar to that explained previously in connection with Fig. 6. The embodiment of Fig. 13, however, differs from that of Fig. 6 in that no transformer is employed to develop the cancellation signal which is impressed upon the control circuit. Rather a resistance R is connected in series between the source and each pair of load windings so that the load currents flowing through the load windings will develop a potential of like waveform across the resistances. The resistances $R_1$ and $R_2$ are so arranged and connected as to develop a resultant potential having a waveform substantially equal in amplitude and opposite in phase to that of the undesired potential induced in the control circuit through its magnetic flux relation with the load circuits and the flow of magnetizing currents through the latter.

Fig. 14 is a magnetic amplifier embodying the present invention in still another version which is similar in most respects to the embodiment illustrated by Fig. 6. Components of the magnetic amplifier itself are substantially the same as those of the embodiment of Fig. 6 with the exception of the means used for develop the cancellation potential. Two separate transformers $T_1$ and $T_2$ are used in the embodiment of Fig. 14 to cooperatively generate the cancellation potential in accordance with the teachings of the present invention. Each transformer has a primary winding connected in series between the power source V and a pair of load windings associated therewith. The secondary windings of both transformers are connected to impress the potentials developed thereacross upon the control circuit and thereby effect cancellation of the undesired potentials induced in the control circuit by the flow of magnetizing currents in the load circuits.

Figs. 14*a*, 14*b* and 14*c* illustrate alternate arrangements of transformers which may be substituted in the embodiment of Fig. 14 for transformers $T_1$ and $T_2$. Operation of the device will remain substantially unchanged by the substitution of such equivalent components.

Throughout this disclosure and discussion thus far, it has been assumed that the load impedances are substantially resistive as indicated in the schematic drawings. This implies, of course, that the load currents have virtually the same waveforms as the load potentials and therefore a cancellation waveform developed from the load current will be substantially of the same waveform as the net load potential. However, the present invention may be readily practiced in applications involving loads which are not purely resistive by selecting for the generation of the cancellation potential an impedance having suitable characteristics for developing from the load currents a potential of waveform comparable to the unwanted induced potentials remaining in the control circuit. This is largely a matter of conforming design considerations to the requisites of each application of the apparatus so that operation in accordance with the teachings of the present invention will be obtained.

One of the most desirable features of the present invention is that the cancellation potential which is generated in accordance with the disclosed concept and teachings is derived from sources related to the basic operative functions of the magnetic amplifier so that a change in operation of the magnetic amplifier will be instantaneously accompanied by a commensurate change in the cancellation potential developed. Thus if the points of conduction of the magnetic amplifier are advanced or retarded in time displacement, changing the duration of magnetizing current flow and thereby changing the duration of the undesired potentials induced in the control windings a consistent, correlated change will be effected in the duration of the cancellation potential sufficient to achieve complete cancellation.

Similarly, upon a change in amplitude of the applied potential, there is an immediate proportional change in amplitude in the cancellation potentials sufficient to accomplish complete cancellation of the undesired potentials which also reflect a change in amplitude. This feature is an inherent characteristic of apparatus operating in accordance with the present invention and is of considerable importance since the cancellation feature will respond instantaneously and automatically to changes in operation of the magnetic amplifier without requiring constant readjustment.

Since many changes could be made in the above construction and many apparently wholly different embodiments of this invention could be made without departing from the scope thereof, it is intended that all matter contained in the above description or shown in the accompanying drawings shall be interpreted as illustrative and not in a limiting sense.

What is claimed is:

1. A magnetic amplifier comprising means defining at least two load current paths connected in push-pull circuit across an alternating current excitation source, said load current paths including a pair of saturable reactors with the load windings connected in parallel and unidirectional conductive means in series with each load winding for passing current alternately through said reactor windings on successive half cycle of the excitation source, control circuit means including control windings in said saturable reactors connected in series across an alternating current signal source for controlling the flow of current through said load paths, impedance means connected in each of said load current paths, means for deriving a voltage proportional to the instantaneous difference in voltages developed across said impedance means by the respective load currents, and means for coupling said proportional voltage into said control circuit in series opposition to the voltage induced in the control circuit by alternating current flowing in the load windings of said reactors.

2. Apparatus as defined in claim 1, wherein said impedance means includes a transformer having the primary winding connected to pass a portion of the load currents in each of said load current paths in opposite directions therethrough, and having the secondary windings connected in series with the control circuit.

3. Means for controlling the flow of current in a center-tapped load including a source of alternating current, a first pair of load circuits each comprising a load winding and a unidirectional current means, said load winding being connected serially between one side of said load and said alternating current source, and said unidirectional current means being serially connected in said load circuits and oppositely poled, a second pair of load circuits of like components connected between said alternating current source and the other side of said load, a connection between the center tap of said load and said alternating current source, a source of alternating current control signal, a control winding wound in magnetic flux relation to each said load winding, said control windings being connected to receive said control signal and arranged in a series circuit so that control current flux will cause a differential current to flow through said load, an impedance connected in the path of the net load current flow, and means to impress upon said control circuit a potential having the waveform developed across said impedance whereby to cancel the potential induced in said control circuit by the flow of magnetizing currents in said load windings.

4. Means for controlling the flow of current in a center-tapped load including a source of alternating current, a first pair of load circuits each comprising a load winding and a unidirectional current means, said load windings being connected serially between one side of said load and said alternating current source, and said unidirectional current means being serially connected in said load circuits and oppositely poled, a second pair of load circuits of like components connected between said alternating current source and the other side of said load, a connection between the center-tap of said load and said alternating current source, a source of alternating current control signal, a control winding wound in magnetic flux relation to each said load winding, said control windings being connected to receive said control signal and arranged in a series circuit so that control current flux will cause a differential current to flow through said load, an impedance connected in series between said alternating current source and said load windings, and means to impress upon said control circuit a potential having the waveform developed across said impedance whereby to cancel the potential induced in said control circuit by the flow of magnetizing currents in said load windings.

5. Means for controlling the flow of current in a center-tapped load including a source of alternating current, a first pair of load circuits each comprising a load winding and a unidirectional current means, said load winding being connected serially between one side of said load and said alternating current source, and said unidirectional current means being serially connected in said load circuits and oppositely poled, a second pair of load circuits of like components connected between said alternating current source and said load, a source of alternating current control signal, a control winding wound in magnetic flux relation to each said load winding, said control windings being connected to receive said control signal and arranged in a series circuit so that control current flux will cause a differential current to flow through said load, an impedance connected between said load and said alternating current source, and means to impress upon said control circuit a potential having the waveform developed across said impedance whereby to cancel the potential induced in said control circuit by the flow of magnetizing currents in said load windings.

6. Means for controlling the flow of current in a center-tap load including a source of alternating current, a first pair of load circuits each comprising a load winding and a unidirectional current means, said load winding being connected serially between said load and said alternating current source, and said unidirectional current means being serially connected in said load circuits and oppositely poled, a second pair of load circuits of like components connected between said alternating current source and one side of said load, a source of alternating current control signal, a control winding wound in magnetic flux relation to each said load winding, said control windings being connected to receive said control signal and arranged in a series circuit so that control current flux will cause a differential current to flow through said load, a center-tapped transformer, the primary winding of said transformer being shunted by a resistive element connected at either end to said load circuits and the center tap of said primary winding being connected to said alternating current source, and the secondary winding of said transformer being connected to said control circuit whereby the potential developed thereacross cancels the potential induced in said control circuit by the flow of magnetizing currents in said load windings.

7. Apparatus in accordance with claim 6 wherein the winding ratio of said transformer is such that it develops potential of substantially the same amplitude and waveform as the potential induced in said control circuit by the flow of magnetizing currents in said load windings.

8. Means for controlling the flow of current in two loads including a source of alternating current, a first pair of load circuits, each of the first pair of load circuits comprising a load winding, a unidirectional current means, and one of the loads serially connected across the alternating current source, a second pair of load circuits, each of the second pair of load circuits comprising a load winding, a unidirectional current means, and the other load serially connected across the alternating current source, a source of alternating current control signal, a control winding wound in magnetic flux relation to each said load winding, said control windings being connected to receive said control signal and arranged in a series circuit so that control current flux will cause an increased flow of load current in one pair of load windings and a decreased flow of load current in the other pair of load windings, an impedance having a first portion connected in series with the first pair of load circuits and a second portion connected in series with the second pair of load circuits, and means to impress upon said control circuit a potential having the waveform developed across said impedance due to the difference in load currents whereby to cancel the potential induced in said control circuit by the flow of magnetizing currents in said load windings.

9. Means for controlling the flow of current through first and second loads including a source of alternating current, a first pair of parallel load circuits, each of the first pair of load circuits comprising a load winding, a unidirectional current means, and one of the loads serially connected across the alternating current source, a second pair of parallel load circuits, each of the second pair of load circuits comprising a load winding, a unidirectional current means, and the other load serially connected across the alternating current source, a source of alternating current control signal, a control winding wound in magnetic flux relation to each said load winding, said control windings being connected to receive said control signal and arranged in a series circuit so that control current flux will cause an increased flow of load current in one pair of load windings and a decreased flow of load current in the other pair of load windings, an impedance connected in the path of load current flow to each load, and means to impress upon said control circuit a potential having the waveform developed across said impedances whereby to cancel the potential induced in said control circuit by the flow of magnetizing currents in said load windings.

10. Means for controlling the flow of current in a load comprising a center-tapped alternating current source, a first pair of parallel load circuits, each being comprised of a load winding and a unidirectional current means serially connected thereto, said first pair of parallel load circuits being connected to one side of said source and to said load, a second like pair of load windings connected to the other side of said source and to the same side of said load, said load being connected on its other side to the center-tap of said source, a source of alternating current control signal, a control winding wound in magnetic flux relation to each said load winding, said control windings being serially connected to receive said control signal and wound with respect to said load windings so that control current flux will cause a differential current to flow through said load, an impedance connected in shunt to said load, and means connected to said control circuit to tap a selectable portion of the potential developed across said impedance, whereby to cancel the potential induced in said control circuit by the flow of magnetizing currents in said load windings.

11. Apparatus in accordance with claim 10 including a secondary control winding wound in magnetic flux relation to each said load winding, said secondary control windings being connected to a secondary control signal source.

12. Means for controlling the flow of current in a load comprising a center-tapped alternating current source, a first pair of parallel load circuits, each being comprised of a load winding and a unidirectional current means serially connected thereto, said first pair of parallel load circuits being connected to one side of said source and to said load, a second like pair of load windings connected to the other side of said source and to the same side of said load, said load being connected on its other side to the center-tap of said source, a source of alternating current control signal, a control winding wound in magnetic flux relation to each said load winding, said control windings being connected to receive said control signal and arranged in a series circuit so that control current flux will cause a differential current to flow through said load, and a transformer having its primary winding connected across said load and its secondary winding connected to said control circuit, whereby to cancel the potential induced in said control circuit by the flow of magnetizing currents in said load windings.

13. Apparatus in accordance with claim 12 including a secondary control winding wound in magnetic flux relation to each said load winding, said secondary control windings being connected to a secondary control signal source.

14. Means for controlling the flow of current in a load comprising a source of alternating current power, four pairs of parallel load circuits connected to said source in a bridge circuit, each of said load circuits comprising a load winding and a unidirectional current device serially connected thereto, a load connected across opposite junctions of said bridge circuit, a source of alternating current control signal, a control winding wound in magnetic flux relation to each load winding, said control windings being connected to receive said control signal and arranged in a series circuit so that control current flux will cause differential current to flow through said load, an impedance connected in shunt to said load, and means connected to said control circuit to tap a selectable portion of the potential developed across said impedance, whereby to cancel the potential induced in said control circuit by the flow of magnetizing currents in said load circuits.

15. Apparatus in accordance with claim 14 including a secondary control winding wound in magnetic flux relation with each load winding, said secondary control windings being connected to a secondary control signal source.

16. Means for controlling the flow of current in a load comprising a source of alternating current power, four pairs of parallel load circuits connected to said source in a bridge circuit, each of said load circuits comprising a load winding and a unidirectional current device serially connected thereto, said load being connected across a pair of opposite junctions of said bridge circuit, a source of alternating current control signal, a control winding wound in magnetic flux relation to each load winding, said control windings being connected to receive said control signal and arranged in a series circuit so that control current flux will cause a differential current to flow through said load, and a transformer having its primary winding connected in shunt to said load and its secondary winding connected to said control circuit whereby to cancel the potential induced in said control circuit by the flow of magnetizing currents in said load circuits.

17. Apparatus in accordance with claim 16 including a secondary control winding wound in magnetic flux relation with each load winding, said secondary control windings being connected to a secondary control signal source.

18. Means for controlling the flow of current in a load comprising a center-tapped alternating current source, a first pair of parallel load circuits connected to one side of said load, each load circuit being comprised of a load winding and a unidirectional current means serially connected thereto, a second pair of like parallel load circuits connected to the other side of said load, means connecting each side of said alternating current source with one load circuit of each parallel pair, an alternating current control signal, a control winding wound in magnetic flux relation to each of said load windings, said control windings being connected to receive said control signal and arranged in a series circuit so that control current flux will cause a differential load current to flow between said first and second pair of load circuits, a transformer having primary windings connected in said load circuits and a secondary winding connected to said control circuit whereby to cancel the potential induced in said control circuit by the flow of magnetizing currents in said load circuits.

19. Apparatus in accordance with claim 18 including a secondary control winding wound in magnetic flux relation to each said load winding, said secondary control windings being connected to a secondary control signal source.

20. Means for controlling the flow of current through first and second loads including a source of alternating current, a first pair of parallel load circuits, each of the first pair of load circuits comprising a load winding, a unidirectional current means, and one of the loads serially connected across the alternating current source, a second pair of load circuits, each of the second pair of load circuits comprising a load winding, a unidirectional current means, and the other load serially connected across the alternating current source, a source of alternating current control signal, a control winding wound in magnetic flux relation to each said load winding, said load windings being connected to receive said control signal and arranged in a series circuit so that control current flux will cause an increased flow of current in one load and a decreased flow of current in the other load, a resistance connected in the path of load current flow to each load, and means to impress upon said control circuit the potential developed across said resistances whereby to cancel the potential induced in said control circuit by the flow of said magnetizing currents in said load currents.

21. Apparatus in accordance with claim 20 including a secondary control winding wound in magnetic flux relation to each said load winding, said secondary control windings being connected to a secondary control signal source.

22. A magnetic amplifier comprising means defining at least two load current paths connected in push-pull circuit across an A.C. excitation source, said load current paths including a pair of saturable reactors, control circuit means including control windings in said saturable reactors connected in series across an alternating current signal source for controlling the flow of current through said load paths, impedance means connected in each of said load current paths, means for deriving a voltage proportional to the difference in voltages developed across said impedance means by the respective load currents, and means for coupling said proportional voltage into said control circuit in series opposition to the voltage induced in the control circuit by magnetizing current flowing in the load windings of said reactors.

23. In a push-pull magnetic amplifier constructed to be energized from an alternating-current source and controlled in accordance with an alternating voltage so as to supply energy to a load, the combination comprising, two sections, each section including magnetic core means, a pair of load windings disposed in inductive relationship with respect to the magnetic core means, and a control winding disposed in inductive relationship with respect to the magnetic core means, circuit means for so interconnecting both pairs of load windings with the load and with the alternating-current source that the voltage across the load varies in accordance with the difference in the magnitude of the current flow through the two pairs of load windings, a transformer having an input and an output, the input of the transformer being connected to be responsive to the current flow through one of said two pairs of load windings, another transformer having an input and an output, the input of said another transformer being connected to be responsive to the current flow through the other of the two pairs of load windings, and other circuit means for connecting the outputs of said transformers and said control windings in series circuit relationship with one another and for rendering said series circuit responsive to said alternating voltage, so that the voltage induced in the said series circuit is bucked out by the output voltages of the said transformers.

24. In a push-pull magnetic amplifier constructed to be energized from an alternating-current source and controlled in accordance with an alternating voltage so as to supply energy to a load, the combination comprising, two sections, each section including magnetic core means, a pair of load windings, a control winding and a bias winding disposed in inductive relationship with the magnetic core means, the bias windings being connected to be energized from a source of potential, circuit means for so interconnecting both pairs of load windings with the load and with the alternating-current source that the voltage across the load varies in accordance with the difference in the magnitude of the current flow through the two pairs of load windings, an electrical device having an input and an output, the input of said device being connected to be responsive to the current flow through one of said two pairs of load windings, another electrical device having an input and an output, the input of said another device being connected to be responsive to the current flow through the other of the two pairs of load windings, and other circuit means for connecting the outputs of said devices and said control windings in series circuit relationship with one another and for rendering said series circuit responsive to said alternating voltage, so that the voltage induced in the said series circuit is bucked out by the output voltages of the said devices.

25. In a push-pull magnetic amplifier constructed to be energized from an alternating-current source and controlled in accordance with an alternating voltage so as to supply energy to a load, the combination comprising, two sections, each section including magnetic core means and a pair of load windings and a control winding disposed in inductive relationship with respect to the magnetic core means, circuit means for so interconnecting the two pairs of load windings with the load and with the alternating-current source that the voltage across the load varies in accordance with the difference in the magnitude of the current flow through the two pairs of load windings, a transformer having a primary winding and a secondary winding, the primary winding being connected to be responsive to the current flow through one of said two pairs of load windings, another transformer having a primary winding and a secondary winding, the primary winding of said another transformer being connected to be responsive to the current flow through the other of the said two pairs of load windings and other circuit means for connecting said control windings and said secondary windings in series circuit relationship with one another and for renderng said series circuit responsive to said alternating voltage, so that the voltage induced in the said series circuit is bucked out by the voltages across the said secondary windings.

26. In a push-pull magnetic amplifier constructed to be energized from an alternating-current source and controlled in accordance with an alternating voltage so as to supply energy to a load, the combination comprising, two sections each section including magnetic core means, and a pair of load windings, a control winding and a bias winding disposed in inductive relationship with the magnetic core means, the bias windings being connected to be energized from a source of potential, circuit means for so interconnecting the two pairs of load windings with the load and with the alternating-current source that the voltage across the load varies in accordance with the difference in the magnitude of the current flow through the two pairs of load windings, a transformer having a primary winding and a secondary winding, the primary winding being connected to be responsive to the current flow through one of said two pairs of load windings, another transformer having a primary winding and a secondary winding, the primary winding of said another transformer being connected to be responsive to the current flow through the other of the said two pairs of load windings and other circuit means for connecting said control windings and said secondary windings in series circuit relationship with one another and for rendering said series circuit responsive to said alternating voltage, so that the voltage induced in the said series circuit is bucked out by the voltages across the said second secondary windings.

27. In a push-pull magnetic amplifier constructed to be energized from an alternating-current source and controlled in accordance with an alternating voltage so as to supply energy to a load, the combination comprising, two sections, each section including two magnetic core members each of which has disposed in inductive relationship therewith a load winding, a control winding and a bias winding, the bias windings being connected to be energized from a source of potential, circuit means for so interconnecting the load windings with the load and with the alternating-current source that the voltage across the load varies in accordance with the difference in the magnitude of the current flow through the load windings of one of the two sections and the current flow through the load windings of the other of the two sections, a transformer having a primary winding and a secondary winding, the primary winding being connected to be responsive to the current flow through the load windings of said one of the two sections, another transformer having a primary winding and a secondary winding, the primary winding of said another transformer being connected to be responsive to the current flow through the load windings of said other of the two sections, and other circuit means for connecting said control windings and said secondary windings in series circuit relationship with one another and for rendering said series circuit responsive to said alternating voltage, so that the voltage induced in the said series circuit is bucked out by the voltages across the said secondary windings.

28. In a push-pull magnetic amplifier constructed to be energized from an alternating-current source and controlled in accordance with an alternating voltage so as to supply energy to a load, the combination comprising, two sections, each section including magnetic core means, a pair of load windings disposed in inductive relationship with respect to the magnetic core means, and a control winding disposed in inductive relationship with respect to the magnetic core means, circuit means for so interconnecting both pairs of load windings with the load and with the alternating-current source that the voltage across the load varies in accordance with the difference in the magnitude of the current flow through the two pairs of load windings, an electrical device having an input and an output, the input of said device being connected to be responsive to the current flow through one of said two pairs of load windings, another electrical device having an input and an output, the input of said another electrical device being connected to be responsive to the current flow through the other of the two pairs of load windings, and other circuit means for connecting the outputs of said devices and said control windings in series circuit relationship with one another and for rendering said series circuit responsive to said alternating voltage, so that the voltage induced in the said series circuit is bucked out by the output voltages of said devices.

References Cited in the file of this patent

UNITED STATES PATENTS

| | | |
|---|---|---|
| 2,259,647 | Logan | Oct. 21, 1941 |
| 2,464,639 | FitzGerald | Mar. 15, 1949 |
| 2,465,451 | Hedstrom | Mar. 29, 1949 |
| 2,477,729 | FitzGerald | Aug. 2, 1949 |
| 2,554,203 | Morgan | May 22, 1951 |
| 2,700,130 | Geyger | Jan. 18, 1955 |

OTHER REFERENCES

Ramey: "On the Control of Magnetic Amplifiers," A.I.E.E. Technical Paper 51-389, published by the American Institute of Electrical Engineers, 33 West 39th Street, New York, N. Y., September 10, 1951, 12 pages.

Scorgie: "Fast Response With Magnetic Amplifiers," U.S. Naval Research Laboratory Report 4205, July 29, 1953, 18 pages.